Jan. 16, 1940.  R. N. DOBLE  2,187,417

TEA BAG, COFFEE BAG, AND THE LIKE

Filed Dec. 30, 1938

Inventor.
Ralph N. Doble
by Heard Smith & Tennant.
Attys.

Patented Jan. 16, 1940

2,187,417

UNITED STATES PATENT OFFICE 2,187,417

TEA BAG, COFFEE BAG, AND THE LIKE

Ralph N. Doble, Hingham, Mass.

Application December 30, 1938, Serial No. 248,387

3 Claims. (Cl. 99—77.1)

This invention relates to tea bags, coffee bags and the like such as are used for making individual cups of infusion. One of the objects of the invention is to provide an improved coffee bag or tea bag which is made of inexpensive material but which has the filtering qualities desirable in coffee bags or tea bags to prevent fine dust particles of the coffee or tea from filtering through the bag, which at the same time has the capacity for allowing air or gas within the bag to readily escape so that the bag will readily sink to the bottom of the cup rather than float on top of the liquid when the bag is being used, which has the wet strength necessary in a coffee bag or tea bag and which is highly porous so that the water will readily pass through the bag for the infusing operation.

Fabric in the nature of cheese cloth is quite universally used in making coffee bags and tea bags, but a bag which has the necessary filtering qualities to prevent the fine dust of the tea or coffee from filtering through the bag must be a very closely woven fabric, and such a fabric is rather expensive for use as a coffee bag or tea bag.

There are various porous papers manufactured which have filtering qualities that meet the requirements for a coffee bag or tea bag, and there is also available a paper of this character having a wet strength sufficient for use as a coffee bag or tea bag.

When, however, paper of this type is wet, a surface tension is developed which makes the paper almost impervious to the passage of air or gas therethrough.

A paper having these characteristics, however, is well adapted for use in making tea bags or coffee bags in accordance with my present invention, which relates to a manner of making the tea bag so as to provide for the ready escape therefrom of any air or gases within the bag when hot water is poured over the bag, or when the bag is placed in hot water for making a cup of infusion.

In accordance with my invention, I use for the bag an inexpensive material having the characteristics above described and the bag is made from a blank of such material which has been provided with perforations for allowing the air or gas to escape from the bag, but which perforations are so located in the bag that they do not detract from the desirable filtering qualities of the bag. As a result, I have produced a very inexpensive bag which has the necessary filtering qualities, the necessary wet strength and the necessary porosity, and which, at the same time, allows the free escape of any air or gas within the bag when the bag is used for making a cup of infusion.

In order to give an understanding of the invention I have illustrated in the drawing some selected embodiments thereof which will now be described after which the novel features will be pointed out in the appended claims.

Figure 1:
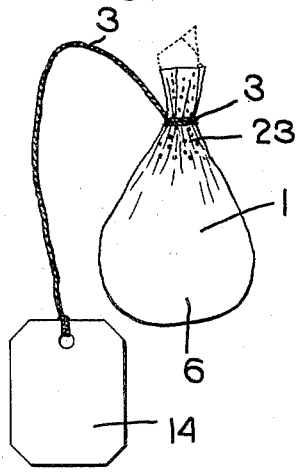
Fig. 1 is a view of a bag of the pouch type embodying my invention.
Figure 2:
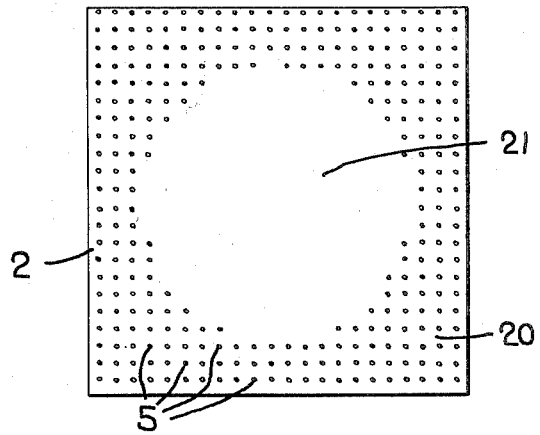
Fig. 2 shows the bag blank from which the bag of Fig. 1 is made.

Referring first to Figs. 1 and 2, I indicates a bag of the pouch type which is formed from a blank 2 such as shown in Fig. 2, the bag I being made from the blank 2 in any usual way by gathering the edges of the blank together and then placing a tie string or fastening device 3 tightly around the gathered together edges. An identifying tag 14 is usually secured to the end of the tie string 3.

The blank 2 is made of some inexpensive material such as paper, which has the desirable filtering qualities that prevent any fine dust from the coffee grounds or tea leaves from sifting through the bag, and which has sufficient wet strength so that it will not be ruptured while making a cup of infusion, and which also is quite porous so that water will flow readily through the bag.

When paper having these characteristics is wet, a surface tension is developed on the paper which impedes very considerably the passage of air or gas through the paper. There is a certain volume of air present in any tea bag or coffee bag, and in the case of a coffee bag the infusing operation results in the generation of a certain amount of gas. In order to make a satisfactory cup of coffee, it is desirable that the air and gas should be discharged from the bag, for the presence of air or gas in the bag will cause it to float on the water in the cup instead of settling to the bottom as is desirable in making a cup of infusion. To provide for this, I propose to form the blank 2 at its peripheral portion 20 with a plurality of small perforations 5, the central portion 21 of the blank being nonperforated. When the bag is formed, the perforated peripheral portion 20 is gathered together to form the mouth of the bag and the tie string 3 is tied around the gathered together edges. The perforations extend over a sufficient portion of the blank so that in the completed bag some of the perforations are located below the tie string, as shown in Fig. 1. The body 6 of the bag in which the infusion-producing material is located is, however, formed from the nonperforated portion of the blank so that in the completed bag, the body 6 of the bag is nonperforated and the perforations will be found in the folded or creased portion 23 of the bag adjacent the tie string. The presence of these perforations in the folded portion of the bag does not interfere with the passage of the gas or air through the perforations when the bag is used, but since these perforations are in the folded portion of the bag the fine dust or particles of coffee grounds or tea leaves will not work out through the perforations as would occur if the perforations were in the bottom or unfolded portion of the bag.

A bag of this type is as satisfactory as a bag made from finely woven cheese cloth but the bag is much less expensive to manufacture because of the low cost of the material from which the bag is made as compared with the finely woven cheese cloth.

Figure 3:
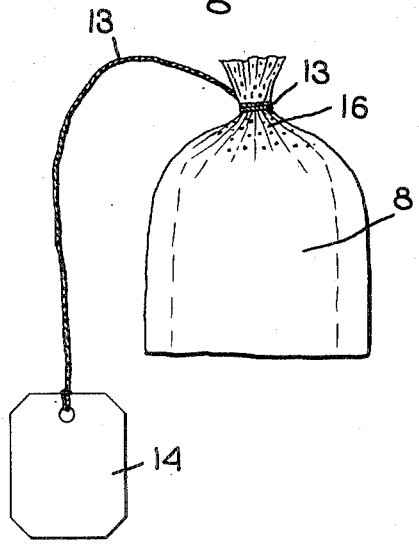
Fig. 3 illustrates a different form of a pouch type bag embodying my invention.
Figure 4:
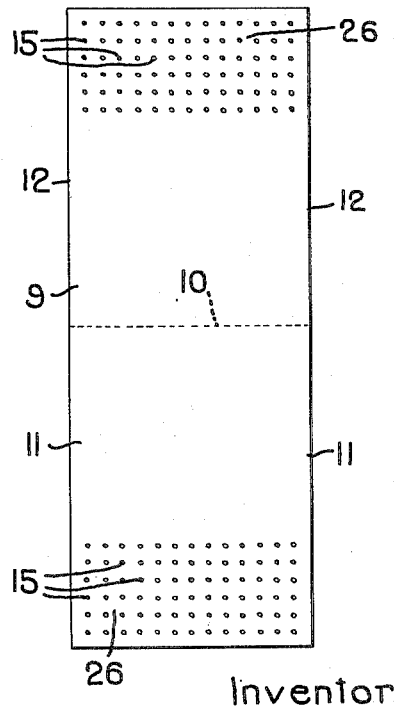
Fig. 4 illustrates the bag blank from which the bag of Fig. 3 is made.

The bag 8 shown in Fig. 3 is of the type which is manufactured from a bag blank 9 having a shape shown in Fig. 4 and in making the bag from the blank, the latter is folded along the central line 10 to bring the edge portions 11 and 12 at each side of the blank together. These mating edge portions may then be sewed together or cemented together, or secured together in any usual way to form the sides of the bag. The open end of the bag thus formed is then closed, after the bag is filled, by means of a tie string 13 to which the usual tag 14 may be secured.

The blank 9 from which this bag may be made is of any inexpensive material, such as paper having the characteristics above set forth. The blank 9, however, is provided at its end portions 26 with small perforations 15, and when the bag is made, these perforations will be found in the neck of the bag where it is fastened by the tie string 13 and in the folded or creased portion 16 immediately below the neck. In this construction, also, the perforations allow the gas and air which may be in the bag to escape freely, but since the perforations are located in the folded or creased portion of the bag, the fine dust particles of the coffee or tea leaves will not escape through the perforations, and the cup of tea or coffee when made will be free from sediment.

I claim:

1. A bag for containing material for making a cup of infusion, which bag is formed from a blank of porous paper having filtering qualities which prevent the passage therethrough of the fine dust from tea leaves or coffee grounds, and also having a high wet strength, which blank has its edges gathered together and secured in their gathered together relation, the material forming the body portion of the bag having the characteristics that when wet, it is to a considerable extent impervious to the passage of air and gas therethrough while the portion of the bag immediately adjacent the point where the edges are secured together is sufficiently porous to allow the free escape of the gas and air.

2. A bag of the pouch type for containing material for making a cup of infusion and which is formed from a blank having its edges gathered together and secured in their gathered together relation by a fastening element, said bag being made of porous paper having a high wet strength and filtering qualities which prevent the passage therethrough of the fine dust from the tea leaves or coffee grounds, and also having the characteristics that, when wet, it is to a large extent imprevious to the passage therethrough of air or gas, the portion of the bag immediately below the fastening element being provided with perforations to provide for the escape of air or gas from within the bag when the latter is used in making a cup of infusion.

3. A bag of the class described formed from a blank having its marginal portions gathered together in folds or creases, and a fastening device encircling the gathered-together portion of the blank and holding them in their gathered-together relation, said bag being made of porous paper which has filtering qualities that prevent the passage therethrough of the fine dust from tea leaves or coffee grounds and which has a high wet strength, the body of the bag, when wet, being to a considerable extent impervious to the passage therethrough of air or gas, while the creased or folded portion of the bag adjacent the fastening device is formed with perforations to permit the escape of such air or gas.

RALPH N. DOBLE.